US008810365B2

(12) United States Patent
Grover (10) Patent No.: US 8,810,365 B2
(45) Date of Patent: Aug. 19, 2014

(54) RANDOM LOCATION AUTHENTICATION

(75) Inventor: Douglas M. Grover, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 340 days.

(21) Appl. No.: 13/082,672

(22) Filed: Apr. 8, 2011

(65) Prior Publication Data

US 2012/0256723 A1 Oct. 11, 2012

(51) Int. Cl.
*G06F 7/04* (2006.01)

(52) U.S. Cl.
USPC ......... 340/5.8; 340/5.52; 340/5.26; 340/5.82; 340/5.54; 340/5.61; 705/67; 713/183; 713/186; 726/19; 715/863; 345/173; 345/168

(58) Field of Classification Search
USPC ......... 340/5.8, 5.52, 5.26, 5.82, 932.23, 5.61, 340/407.2, 5.54; 705/67; 713/186; 726/19; 715/863; 345/173, 168
See application file for complete search history.

(56) References Cited

U.S. PATENT DOCUMENTS

| | | | | |
|---|---|---|---|---|
| 5,186,629 | A * | 2/1993 | Rohen | 434/114 |
| 6,720,860 | B1 * | 4/2004 | Narayanaswami | 340/5.54 |
| 7,073,067 | B2 * | 7/2006 | Mizrah | 713/183 |
| 8,451,240 | B2 * | 5/2013 | Pasquero et al. | 345/173 |
| 8,539,387 | B1 * | 9/2013 | Lin et al. | 715/863 |
| 8,601,552 | B1 * | 12/2013 | Bowers et al. | 726/5 |
| 8,638,939 | B1 * | 1/2014 | Casey et al. | 380/277 |
| 8,661,532 | B2 * | 2/2014 | Yi et al. | 726/19 |
| 2003/0210127 | A1 * | 11/2003 | Anderson | 340/5.27 |
| 2004/0179692 | A1 * | 9/2004 | Cheng | 380/278 |
| 2006/0230435 | A1 * | 10/2006 | Kokumai | 726/4 |
| 2008/0222426 | A1 * | 9/2008 | Schrijen et al. | 713/186 |
| 2009/0135142 | A1 * | 5/2009 | Fu et al. | 345/168 |
| 2009/0249475 | A1 * | 10/2009 | Ohaka | 726/16 |
| 2009/0307139 | A1 * | 12/2009 | Mardikar et al. | 705/67 |
| 2010/0081476 | A1 * | 4/2010 | Markiewicz et al. | 455/566 |
| 2010/0218249 | A1 * | 8/2010 | Wilson et al. | 726/19 |
| 2010/0308983 | A1 * | 12/2010 | Conte et al. | 340/407.2 |
| 2010/0311390 | A9 * | 12/2010 | Black et al. | 455/410 |
| 2011/0032200 | A1 * | 2/2011 | Park et al. | 345/173 |
| 2011/0204140 | A1 * | 8/2011 | Hart et al. | 235/380 |

* cited by examiner

*Primary Examiner* — Benjamin C Lee
*Assistant Examiner* — Chico A Foxx (57) ABSTRACT

An authentication string, such as a password, consists of characters. Each of the characters in the authentication string is randomly associated with a defined location on a device. For example, an area on a touch screen can be associated with a character in the authentication string. When a user selects a location associated with the character, feedback is provided that identifies the character. When the user selects a location that is not associated with the character, feedback is provided that does not identify the character.
If the user responds by indicating that the associated location matches the character, the character is authenticated. If the user responds by indicating that a location not associated with the character is a match, the character is not authenticated. This process is then repeated for each character in the authentication string.

20 Claims, 5 Drawing Sheets

RANDOM LOCATION AUTHENTICATION

TECHNICAL FIELD

The system and method relates to authentication systems and more specifically to authentication systems for devices.

BACKGROUND

Existing authentication systems for mobile devices, Automated Teller Machines (ATM), automobiles, and the like typically have problems where the authentication system is subject to various kinds of security breaches. For example, when a person enters their Personal Identification Number (PIN) at an ATM, their PIN can be viewed by others. The PIN can be seen by someone looking over the shoulder of the person entering the PIN. Other breaches to PIN security have occurred where thieves place small cameras above the ATM to view the PIN entry process.

These problems are also prevalent in security for mobile devices such as cellular phones, tablet devices, personal computers, and the like. Today, many of these mobile devices contain sensitive information that users and corporations would like to keep secure. Like ATMs, many of these devices offer protection using some type of password to deny, access if the mobile device is lost or stolen. The problem is that if someone can easily learn the password through observation, the security of the mobile device can be compromised and left open to theft.

To overcome some of these problems, the addition of biometric authentication, the requiring of multiple types of authentication (e.g., PIN and biometric), and the like are used to increase authentication security. The use of additional, hardware to provide biometric authentication, can be expensive and is not ubiquitous on mobile devices. Typically, a mobile device will have a touch screen and a vibrator, which does not lend itself to the use of biometric authentication. In addition, existing solutions are not tailored for users who are blind and need handicap access. What is needed is a simple authentication solution that can be used in existing devices, such as ATMs, mobile devices, and automobiles, that cannot be breached through observation.

SUMMARY

The system and method are directed to solving these and other problems and disadvantages of the prior art. An authentication string such as a password consists of characters. Each of the characters in the authentication string is randomly associated with a defined location on a device. For example, an area on a touch screen can be associated with a character in the authentication string. When a user selects a location associated with the character, feedback is provided that identifies the character. When the user selects a location that is not associated with the character, feedback is provided that does not identify the character.

If the user responds by indicating that the associated location matches the character, the character is authenticated. If the user responds by indicating that a location not associated with the character is a match, the character is not authenticated. This process is then repeated for each character in the authentication string.

In some embodiments, feedback can be provided audibly or by using a vibrator. The use of audible feedback allows the use of alpha-numeric characters, words, symbols, phrases, and the like. Selection of a location can be accomplished by the use of a video camera, a click of a mouse, via a touch screen, and the like. Likewise, responses to feedback can be detected by a touch screen, a camera, a microphone, and the like.

In yet another embodiment, the use of a Dual-Tone Multi-Frequency (DTMF) keypad, a keypad, or a keyboard can be used. The use of DTMF keypads allow the authentication system to be implemented in a variety of existing devices.

BRIEF DESCRIPTION OF THE DRAWINGS

In order to describe the manner in which other advantages and, features of the disclosure can be obtained, a more particular description of the principles and the best mode briefly described below will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
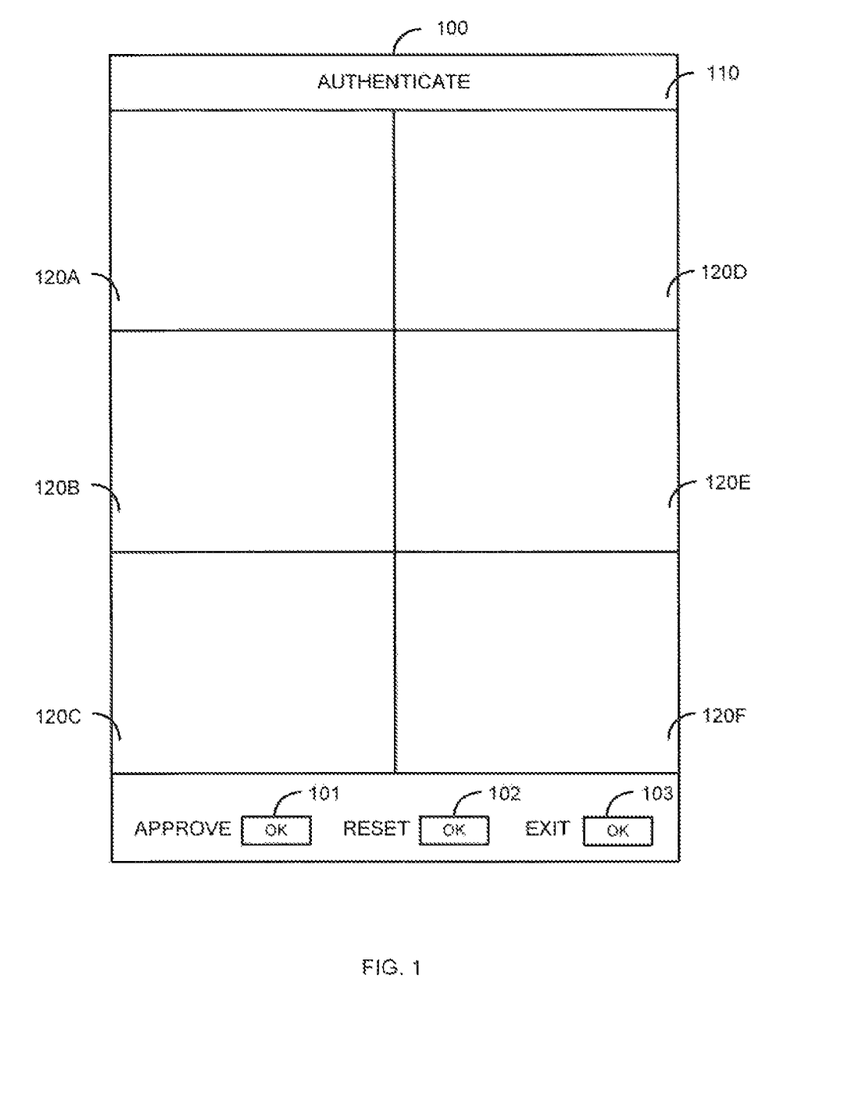
FIG. 1 is a diagram of a front view of a device for authenticating a user.

FIG. 1 is a diagram of a front view of device 100. Device 100 comprises user interface 110, locations 120A-120F, approve button 101, reset button 102, and exit button 103. Device 100 can be any type of device, such as a cellular telephone, a tablet device, a personal computer, an Automated Teller Machine (ATM), an automotive system, a security system and the like.

User interface 110 can be any type of mechanism where a user can provide input, such as a touch screen, a Graphical User Interface (GUI), a mouse, a keyboard, a touch pad, a key pad, a microphone, a camera, a combination of these, and the like. In this illustrative example, part of user interface 110 is divided into six locations 120A-120F.

Locations 120A-120F are shown as squares. However, locations 120A-120F can be organized differently, such as circles, diamonds, rectangles, a combination of these, and the like. Locations 120A-120F can be any shape or combination of shapes. Location 120 can be a physical object on device 100. For example, location 120 can be a key on a Dual-Tone Multi-Frequency (DTMF) keypad. A DTMF keypad can be divided up into twelve locations 120 (1 for each key), ten locations 120 (1 for each numeric key), and the like. Locations 120A-120F on device 100 may be virtual and could change over time. For example, a touch pad could change the layout of locations 120A-120F to circles based on a user selection. The size of locations 120A-120F can be made smaller or larger based on user input or configuration information. Locations 120A-120F can be different colors.

Buttons 101-103 can be any type of button, such as a physical button, a virtual button, a menu item, an icon, and the like. Buttons 101-103 are part of an exemplary embodiment, but may not be part of other embodiments. Approve button 101 can be any type of button that allows the user to approve an authentication. Reset button 102 can be any type of button that allows the user to reset the authentication process. Exit button 103 can be any type of button that allows the user to exit the authentication process.

Figure 2:
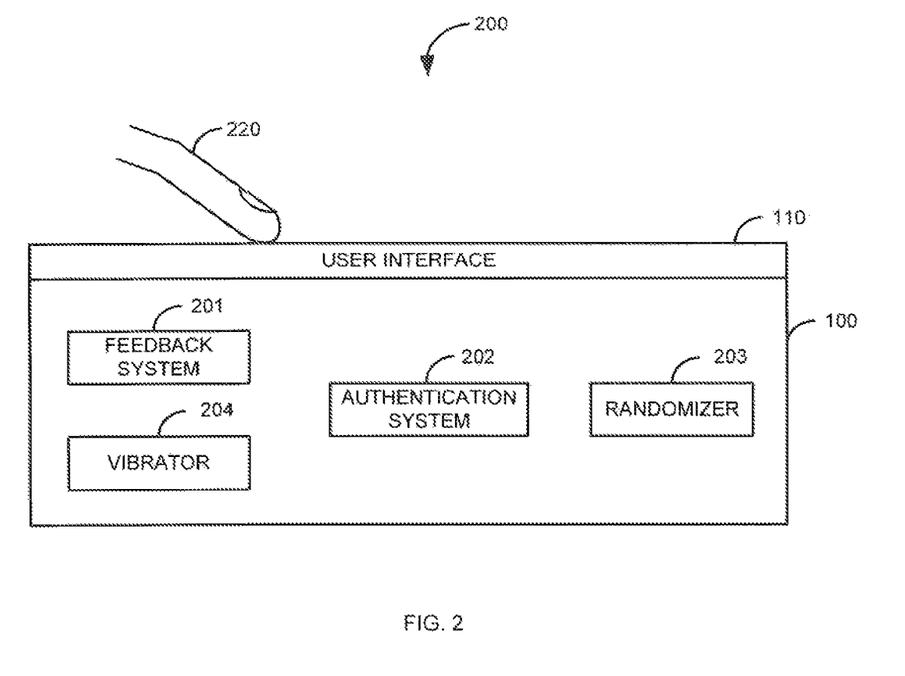
FIG. 2 is a block diagram of a first illustrative system for authenticating a user.

FIG. 2 is a block diagram of a first illustrative system 200 for authenticating a user. The first illustrative system 200 comprises device 100, user interface 110, feedback system 201, authentication system 202, randomizer 203, and vibrator 204. Finger 220 is shown for illustrative purposes.

Feedback system 201 can be any hardware/software that can provide feedback to a user, including a display, a touch screen, a speaker, vibrator 204, a buzzer, ear bud(s), headphone(s), a mechanical device, and the like. Authentication system 202 can be any hardware/software that can provide authentication methods for passwords, Personal Identification Numbers (PIN), bio-metrics, and the like. Randomizer 203 can be any hardware/software that can be used to randomize data.

Authentication system 202 gets an authentication string. The authentication string comprises one or more characters. The authentication string can be, for example, a password or PIN. A character can be a number, an alpha-numeric character, a non-alpha-numeric character, a symbol, an American Standard Code for Information Interchange (ASCII) character, a localized character, and the like. A character can be in any language. An individual character can represent multiple digits, one or more letters, a word, a phrase, and the like.

Authentication system 202 defines a plurality of locations 120 on device 100. How authentication system defines locations 120A-120F can be done dynamically or can be accomplished using pre-defined location 120. The number of locations 120 defined can be two or more. Randomizer 203 randomly associates at least one of the plurality of locations 120A-120F on device 100 with the character. Typically, randomizer 203 will only associate one character with one location 120; however, randomizer 203 can associate more than one location 120 with an individual character. If there are multiple characters in the authentication string, randomizer 203 can associate one location 120 with one or more character in the authentication string.

Feedback system 201 provides feedback to the user when the user selects one of the locations 120 associated with the character. The feedback provided to the user identifies the character associated with the location 120. The feedback can be provided in various ways, such as audibly, via a vibrator 204, visually, and the like. For example, if the character represented the number 2, feedback system 201 (via vibrator 204) vibrates two times when the user selected (i.e., touched) the associated location 120 on device 100.

Feedback system 201 provides feedback to the user when the user selects a location 120 that is not associated with the character. The feedback that is provided does not identify the character associated with location 120. For example, assume that the character represents the number 2, location 120B is associated with the character, location 120A is not associated with the character, and selecting a location 120 is accomplished by the user touching one of the two locations 120A-120B.

When the user touches location 120A, the feedback will not identify the number 2 because the location 120A is not associated with the character. In this example, feedback system 201 via vibrator 204 identifies a number other than 2 (e.g., the number 3 by vibrating 3 times) when the user touches location 120A. When the user touches location 120B, the feedback identifies the number 2 (e.g., by vibrator 204 vibrating 2 times) because location 120B is associated with the character.

In response to the feedback identifying the character associated with location 120, the user indicates that the selected location 120 matches the character. Authentication system 202 receives the indication. In response to receiving the indication that the feedback for the selected associated location 120 matches the character and not receiving an indication to the feedback when the user selects location 120 that is not associated with the character, authentication system 202 authenticates the character. If the authentication string is only a single character, then the user is authenticated to use device 100.

If the authentication string is longer than one character, the above process is repeated for each character in the authentication string. The user is authenticated based on receiving an indication to the feedback for each of the selected associated locations 120 and not receiving an indication to the feedback when the user selects a location 120 that is not associated with the character.

To illustrate how this system works, consider the following example. Assume that device 100 has a touch screen (user interface 110), that the user has a numeric password of four digits 1-2-3-4 (an authentication string with 4 characters), and that vibrator 204 is used to provide feedback to the user. Also assume that location 120B is associated with the first character (1) of the password location 120F is associated with the second character (2) of the password, location 120D is associated with the third character (3) of the password, and location 120C is associated with the fourth character (4) of the password. In this example, each of the associated locations 120B, 120C, 120D and 120F are associated with a single character.

The user is presented with user interface 110 shown in FIG. 1 to authenticate the user to device 100. The user moves his finger 220 into location 120A. Vibrator 204 will vibrate a sequence to represent a number that is not the first character (1) in the password (e.g. by vibrating five times). The user then moves his finger 220 into location 1201B. This time vibrator 204 vibrates one time to match the character (the first character in the password (1)).

The user, upon recognizing that the vibrated value matches the first character (1) in the password, indicates the match by double-tapping-on location 120B. Authentication system 202 authenticates the first character (1) in the authentication string. The user repeats this process and touches location 120A and vibrator 204 vibrates a number other than 2. The user moves across locations 120B-120E, each time receiving feedback of a number other than 2. Upon selecting location 120F, the user receives the feedback matching the second number in the password. The user then double-taps location 120F to indicate the match.

This process is then repeated for the next two characters in the authentication string. Once the user has correctly identified each location 120 associated with each of the characters in the authentication string, the user selects approve button

101 and authentication system 202 authenticates the user to device 100. This is assuming that during the authentication process the user did not select location 120 that was not associated with a character that is being authenticated. The use of approve button 101 is not necessary. Authentication system 202 could automatically authenticate the user once all the characters in the authentication string have been authenticated.

If the user makes a mistake authenticating, the user can select reset button 102 to start the authentication process from the beginning. The user can also select exit button 103 to exit the authentication process.

In another embodiment, instead of user interface 110 being a touch screen, user interface 110 is a Dual-Tone Multi-Frequency (DTMF) keypad like those found commonly on a telephone. The keypad does not have to use DTMF and could be, for example, a keypad on a keyboard. There are ten locations 120 (keys), one for each digit (0-9) on the keypad. Instead of touching a key, the user presses a key to select location 120. Vibrator 204 vibrates a sequence. Like described above, the vibrated sequence will either match the character (if the key is associated with the character) or will not match the character if the key is not associated with the character. If the character is a zero, then vibrator 204 would not vibrate based on the selection. If there is a match, the user will press the key again. If there is not a match, the user will not select the key and will move on to the next key and make another selection by pushing the key. This is repeated until the correct key associated with the character is found. Likewise, this process is repeated for each character. Once the user has confirmed each character in the password, the user can press another button on the telephone (e.g., the #button) to approve the authentication so that authentication system 202 can authenticate the user to the telephone (device 100).

In yet another embodiments the authentication system can be used with a device such as a Personal Computer ("PC") and mouse. The screen of the PC can be divided into, locations 120A-120F. A user can select the locations 120A-120F using a mouse. Feedback can be provided by vibrator 204, or through headphones, and the indication process can also be accomplished using the mouse (e.g., the user double-clicking the mouse).

Figure 3:
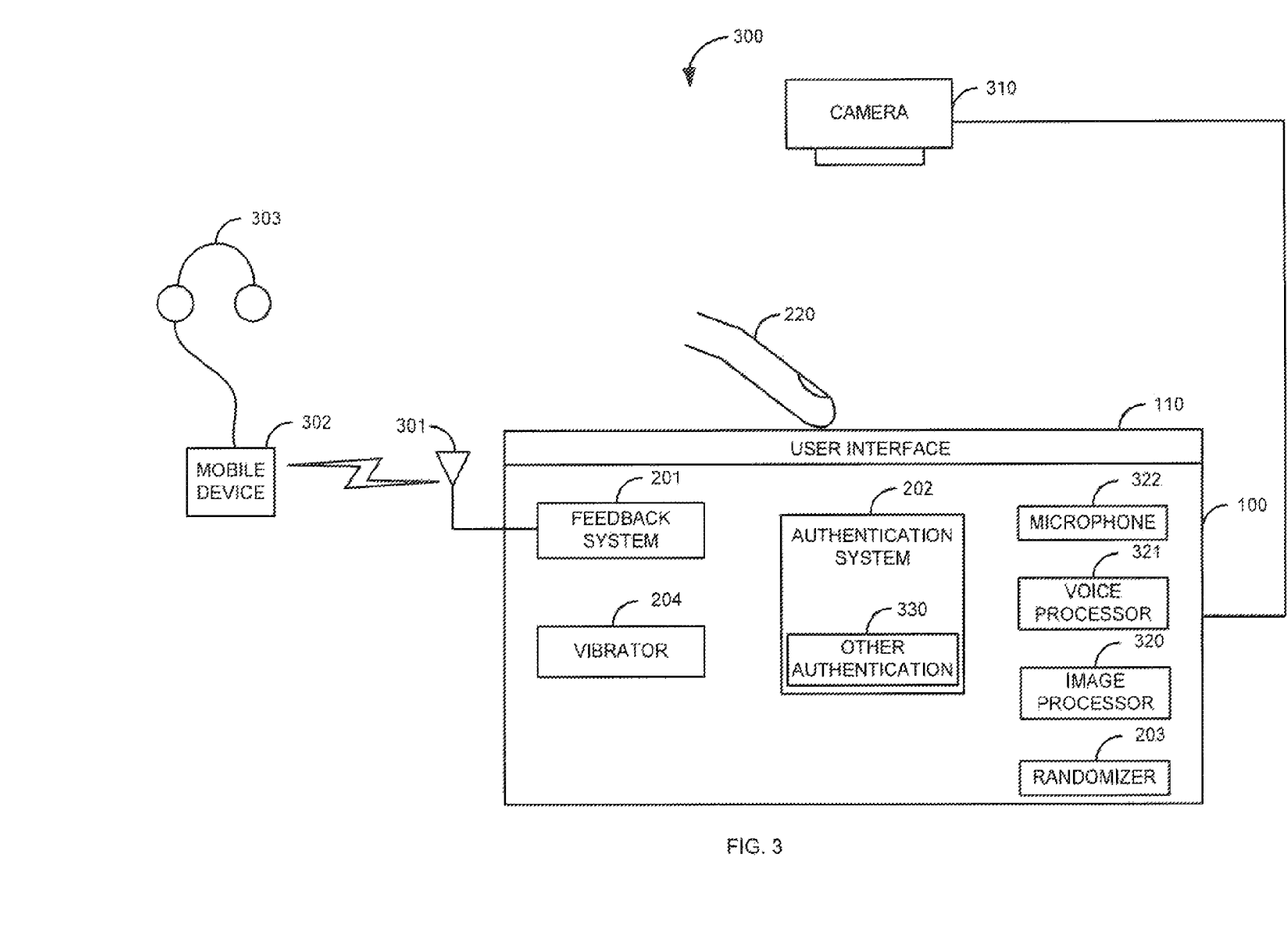
FIG. 3 is a block diagram of a second illustrative system for authenticating a user.

FIG. 3 is a block diagram of a second illustrative system 300 for authenticating a user. The second illustrative system 300 comprises device 100, user interface 110, feedback system 201, authentication system 202, randomizer 203, vibrator 204, antenna 301, mobile device 302, headphone(s) 303, image processor 320, voice processor 321, microphone 322, camera 310, and other authentication 330. Finger 220 is shown for illustrative purposes.

Feedback system 201 can also include the ability to provide feedback audibly. Audio feedback can be accomplished by feedback system 201 by sending a signal via antenna 301 (e.g., via Bluetooth, WiFi, etc.) to mobile device 302. The received signal is then played to the user via headphone(s) 303. In another alternative embodiment, headphone(s) 303 can be directly connected to device 100/feedback system 201. Headphone(s) 303 can be ear bud(s) and the like.

One advantage to providing audio feedback via headphones 303 is that the authentication string can include alpha-numeric characters. This is because the alpha-numeric characters can be played audibly to the user. In addition, audio can support, other characters (e.g., #, *, etc.), symbols, phrases, words, and the like. For example, assume that the character is the word "ball." As the user selects location 120 associated with the character "ball," feedback system 201 can play the word "ball" to the user via headphones 303.

The authentication string could represent a phrase. For instance, a four character authentication string can represent the phrase "the ball is red." In this example, the authentication string has one character for each word in the phrase.

In yet another embodiment, a character in the authentication string can represent a phrase such as "the color is blue" and the authentication string could represent multiple phrases.

Authentication system 202 also comprises other authentication 330. Other authentication 330 can comprise any other type of authentication. For example, other authentication 330 can be bio-metric authentication, such as fingerprint authentication, voice authentication, retinal scan authentication and the like.

User interface 110 can also comprise other types of mechanisms for detecting user input such as camera 310. For example, camera 310 can detect the user selection of location 120. This can be accomplished by image processor 320 processing the video signal of camera 310 to identify a selection. If the user moves their finger 220 over location 120, camera 310/image processor 320 detects this as a selection. A selection can be determined by how the person moves their finger 220 over location 120, how a person gestures in relation to location 1220 and the like.

Camera 310 can also be used to detect the indication to the feedback. For example, after a person moves their finger 220 over location 220 to select location 120, camera 310 can detect specific movements that are an indication to the feedback. The user can wiggle their finger 220 to indicate a response to the feedback, move their finger 220 in a specific direction, and the like. A system such as this can be used where user interface 110 is not a touch screen.

User interface 310 can also receive input from the user via voice commands. For example, the user can indicate a response to the feedback identifying a character associated with location 120 by saying a response such "approve" or "yes." Microphone 322 picks up the verbal command and voice processor 321 processes the verbal command.

Authentication system 202 gets an authentication string. An authentication string comprises one or more characters. Authentication system 202, defines a plurality of locations 120A-120F on device 100. Randomizer 203 randomly associates at least one of the plurality; of locations 120A-120F on device 100 with the character.

Feedback system 201 provides feedback to the user when the user selects one of the locations 120A-120F associated with the character. The feedback provided to the user identifies the character associated with the location 120. For example, when the user touches (selects) location 120 associated with the character; feedback system 201 can send a signal via antenna 301 to mobile device 302. The signal indicates the character. Mobile device 302 then plays the character to the user via headphones 303. To further illustrate this, assume that the character associated with location 120D is the letter "a." When the user touches associated location 120D, feedback system 201 via headphones 303/mobile device 302 will say "a" to the user.

Feedback system 201 provides feedback to the user when the user selects a location 120 that is not associated with the character. The feedback that is provided does not identify the character associated with location 120. For example, assume that the character represents the character "x." When the user touches location 120A, which is not associated with the letter "x;" feedback system 201 via headphones 303/mobile device 302 says "r" to the user.

In response to the feedback identifying the character associated with location 120, the user indicates that the selected location 120 matches the character. Authentication system 202 receives the indication. In response to receiving the indication that the feedback for the selected associated location 120 matches the character and not receiving an indication to the feedback when the user selects location 120 that is not associated with the character, authentication system 202 authenticates the character. If the authentication string is only a single character, then the user is authenticated to use device 100.

If the authentication string is longer than one character, the above process, is repeated for each character in the authentication string. The user is authenticated based on receiving an indication to the feedback for each of the selected associated locations 120 and not receiving an indication to the feedback when the user selects location 120 that is not associated with the character.

Figure 4:
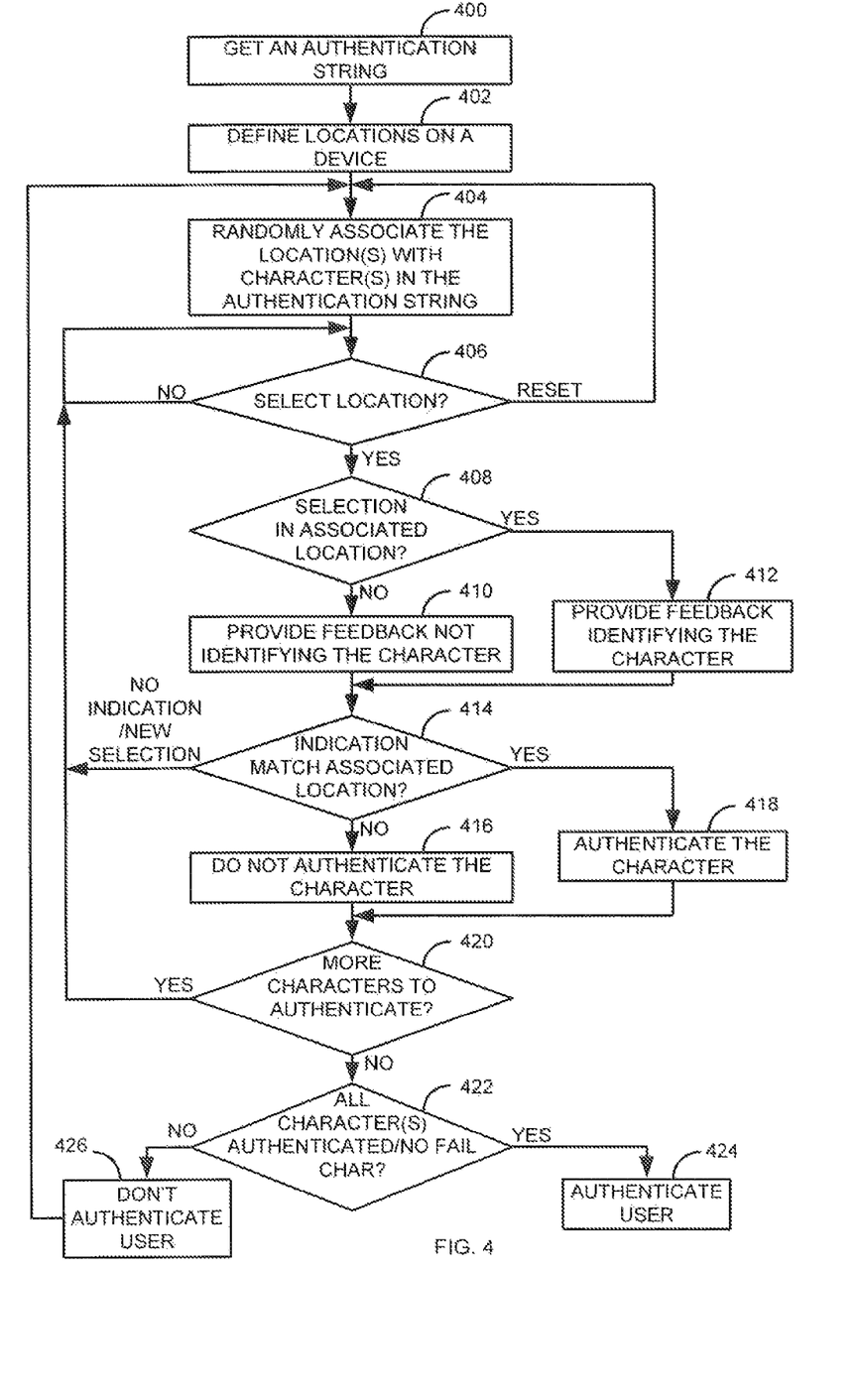
FIG. 4 is a flow diagram of a method for authenticating a user.

FIG. 4 is a flow diagram of a method for authenticating a user. Illustratively, device 100, user interface 110, feedback system 201, authentication system 202, randomizer 203, image processor 320, voice processor 321, mobile device 302, and camera 310 are stored-program-controlled entities, such as a computer or processor, which performs the method of FIGS. 4-5 and the processes described herein by executing program instructions stored in a tangible computer readable storage medium, such as a memory or disk.

Authentication system 202 gets 400 an authentication string that comprises a character(s). Authentication system 202 defines 402 a plurality of locations 120A-120F on device 100. Randomizer 203 randomly associates 404 at least one of the plurality of locations 120A-120F on device 100 with the character.

If there is more than one character in the authentication string in step 404, each character in the authentication string is randomly associated with one of the defined locations 120A-120F. Different characters in the authentication string can be randomly associated with the same location 120 or each character in the authentication string can be randomly associated with different locations 120. For example, if the authentication string contained two characters, both characters can be randomly associated with location 120F or the two characters can be randomly associated with different locations (e.g., 120A and 120E).

Authentication system 202 checks in step 406 if the user has selected one of locations 120A-120F. If the user has not selected one of location 120A-120F in step 406, step 406 is repeated. If the user resets the authentication process in step 406, the process goes to step 404. Otherwise, if the user has selected one of locations 120A-120F in step 406, authentication system 202 determines in step 408 if the user has selected location 120 that is associated with the character. If the selected location 120 is associated with the character in step 408, feedback system 201 provides 412 feedback identifying the character grid the process goes to step 414. Otherwise, if the user has selected location 120 that is not associated with the character in step 408, feedback system 201 provides 410 feedback not identifying the character.

User interface 110 waits to receive an indication from the user that the feedback matches the associated location 120 in step 414. If there is no indication (i.e. the user has selected location 120 that is not associated with the character) that the feedback matches the associated location 120 or the user has selected a new location 120 in step 414, the process goes to step 406. If the user has indicated location 120 not associated with the character in step 414, authentication system 202 does not authenticate 416 the character and the process goes to step 420. Otherwise, if the user indicates a match in, location 120 associated with the character in step 414, authentication system 202 authenticates 418 the character and the process goes to step 420.

If there, are more, characters in the authentication string in step 420, the process goes, to step 406 to authenticate the next character in the authentication string. If there are not any more characters to authenticate in step 420, authentication system 202 determines if all the characters in the authentication string have been authenticated and that there were not any locations 120 indicated that were not associated with the character in step 422. If all the characters in the authentication string have been authenticated and there were not any locations 120 indicated that were not associated with the character (s) in step 422, the user is authenticated 424. Otherwise, if all the characters in the authentication string have not been authenticated or if there was an indication that was not associated with the character (not authenticate the character in step 416), the user is not authenticated in step 426, and the process goes to step 404.

Step 420 is shown as automatically determining if there are more characters in the authentication string. However, step 420 can look for user input (e.g., the user clicking on approve button 101) to determine if there are more characters. This way, someone trying to guess the authentication string length will not know the length of the authentication string. If the user clicks approve button 101 before all the characters in the authentication string have been approved, step 422 will not authenticate the user because all of the characters in the authentication string have not been authenticated. Similarly, if the user indicates an extra character in the authentication string, step 422 will fail because there was a failed character. For the extra character, feedback system 201 would provide dummy feedback and would automatically not authenticate the character in step 416.

Figure 5:
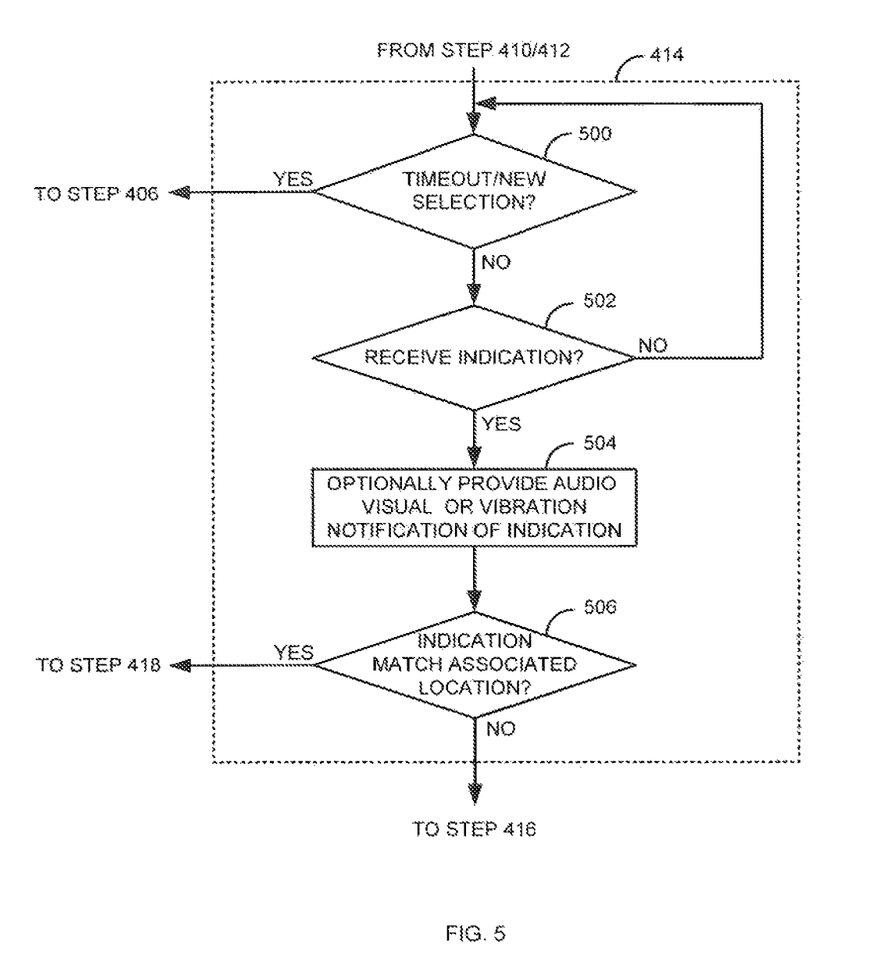
FIG. 5 is a flow diagram of a method for processing user responses during an authentication process.

FIG. 5 is a flow diagram of a method for processing user responses during, an authentication process. FIG. 5 is an exemplary view of step 414 in FIG. 4. After providing the feedback to the user in either step 410 or step 412, user interface 10 determines in step 500 if there has been a timeout (no indication by the user) or if the user has selected a new location 120. A timeout can be user-defined and/or pre-defined. For example, if the user does not respond for 10 seconds, this would cause the system to timeout. If there has been a timeout or if the user has selected a new location 120 in step 500, the process goes to step 406. Otherwise, user interface 110 determines if it has received an indication from the user in step 502. If user interface 110 has not received the indication in step 502, the process goes to step 500.

If user interface 110 has received the indication to the feedback in step 502, feedback system 201 can optionally provide 504 an audio, visual, or vibration notification of the indication. For example, if the indication is when the user taps on the location 120 (either an associated location or not), feedback system 201 can provide the notification of the indication in step 504 by highlighting the selected location 120. Other alternatives can include providing an audible indication such as a beep or a vibration in a pattern.

If the indication matches the associated location 120 in step 506, the process goes to step 418. Otherwise, if the indication does not match the associated location 120 in step 506, the process goes to step 416.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A. B and C together.

Herein, the term "a," "an" or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

In the claims, the ordering of steps (e.g., a, b, c, etc.) does not indicate that the steps must be performed in the recited order. As one of ordinary skill in the art would recognize, the order may vary based on implementation and design considerations.

What is claimed is:

1. A method comprising:
   a. getting an authentication string, the authentication string comprising a character;
   b. defining a plurality of locations on a device;
   c. randomly associating at least one of the plurality of locations on the device with the character;
   d. providing a feedback to a user when the user selects an associated location of the plurality of locations, the feedback identifying the character associated with the location;
   e. providing a feedback to the user when the user selects a location of the plurality of locations not associated with the character, the feedback not identifying the character associated with the location;
   f. receiving an indication from the user that the feedback for the selected associated location of the plurality of locations matches the character; and
   g. in response to receiving the indication that the feedback for the selected associated location matches the character and not receiving an indication to the feedback when the user selects a location that is not associated with the character, authenticating the character.

2. The method of claim 1, wherein the authentication string comprises a plurality of characters, and further comprising the steps of completing steps c-g for each of the plurality of characters in the authentication string and authenticating the user is based on receiving the indication to the feedback for each of the selected associated locations and not receiving the indication to the feedback when the user selects the location that is not associated with the character.

3. The method of claim 2, wherein authenticating the user further comprises the step of authenticating the user with a second authentication method.

4. The method of claim 1, wherein the character represents a number, the feedback to the user is provided by a vibrator, and the vibrator vibrates a number of times equal to the number when the user selects the location associated with the character.

5. The method of claim 1, wherein the character represents an alpha-numeric character and the feedback is provided audibly to the user via ear-buds or headphones.

6. The method of claim 1, wherein the user selecting the location is accomplished by the user touching the selected location and the indication by the user that the feedback for the selected location matches the character is accomplished by the user tapping the location associated with the character one or more times.

7. The method of claim 1, wherein the indication is accomplished by a verbal command.

8. The method of claim 1, wherein the indication that the feedback for the selected location matches the character is determined by one of the following: a touch screen, a video camera, and a mouse click.

9. The method of claim 1 wherein the indication that the feedback for the selected location matches the character is determined by the user pushing a key on a Dual-Tone Multi-Frequency (DTMF) keypad.

10. The method of claim 1, further comprising the steps of:
   h. receiving the indication to the feedback when the user selects a location not associated with the character;
   i. providing a visual, an audio, and/or a vibration notification when the user indicates that the feedback for the selected location matches the character; and
   j. providing the visual, the audio, and/or the vibration notification when the user indicates that feedback for the selected location is not associated with the character.

11. A system comprising:
   an authentication system operable to get an authentication string, the authentication string comprising a character, define a plurality of locations on a device, and authenticate the character in response to receiving an indication that a feedback for the selected associated location of the plurality of locations matches the character and not receiving an indication to the feedback when a user selects a location of the plurality of locations that is not associated with the character;
   a randomizer operable to randomly associate at least one of the plurality of locations on the device with the character; a feedback system operable to provide the feedback to the user when the user selects an associated location of the plurality of locations, the feedback identifying the character associated with the location, the feedback system operable to provide the feedback to the user when the user selects a location of the plurality of locations not associated with the character, the feedback not identifying the character associated with the location; and
   a user interface operable to receive the indication from the user that the feedback for a selected associated location of the plurality of locations matches the character.

12. The system of claim 11 wherein the authentication string comprises a plurality of characters, the authentication system, the randomizer, the feedback system, and the user interface are further operable to repeat the process for each of the plurality of characters in the authentication string and the authentication system is further operable to authenticate the user based on receiving the indication to the feedback for each of the selected associated locations and not receiving the indication to the feedback when the user selects the location that is not associated with the character.

13. The system of claim 12, wherein the authentication system is further operable to authenticate the user with a second authentication.

14. The system of claim 11, wherein the character represents a number, the feedback to the user is provided by a vibrator, and the vibrator vibrates a number of times equal to the number when the user selects the location associated with the character.

15. The system of claim 11, wherein the character represents an alpha-numeric character and the feedback is provided audibly to the user via ear-buds or headphones.

16. The system of claim 11, wherein the user selecting the location is accomplished by the user touching the selected location and the indication by the user that the feedback for the selected location matches the character is accomplished by the user tapping the location associated with the character one or more times.

17. The system of claim 11, wherein the indication is accomplished by a verbal command.

18. The system of claim 11, wherein the indication that the feedback for the selected location matches the character is determined by one of the following: a touch screen, a video camera, and a mouse click.

19. The system of claim 11, wherein the indication that the feedback for the selected location matches the character is determined by the user pushing a key on a Dual-Tone Multi-Frequency (DTMF) keypad.

20. The system of claim 11, wherein the user interface is further operable to receive an indication to the feedback when the user selects a location not associated with the character, the feedback system is operable to provide a visual, an audio, and/or a vibration notification when the user indicates that the feedback for the selected location matches the character and to provide the visual, the audio, and/or the vibration notification when the user indicates that the feedback for the selected location is not associated with the character.

* * * * *